United States Patent
Wang et al.

(10) Patent No.: US 8,401,286 B2
(45) Date of Patent: Mar. 19, 2013

(54) IMAGE DETECTING DEVICE AND METHOD

(75) Inventors: Chi-Feng Wang, Taipei County (TW); Hui-Hung Lin, Kaohsiung County (TW)

(73) Assignee: Realtek Semiconductor Corp., Hsinchu (TW)

( * ) Notice: Subject to any disclaimer, the term of this patent is extended or adjusted under 35 U.S.C. 154(b) by 982 days.

(21) Appl. No.: 12/419,416

(22) Filed: Apr. 7, 2009

(65) Prior Publication Data
US 2009/0252407 A1    Oct. 8, 2009

(30) Foreign Application Priority Data
Apr. 8, 2008    (TW) .............................. 97112648 A

(51) Int. Cl.
*G06K 9/40* (2006.01)
*G06K 9/62* (2006.01)
(52) U.S. Cl. ...................................... 382/165; 382/218
(58) Field of Classification Search .................. 382/165, 382/173, 305, 312, 218, 224; 348/173
See application file for complete search history.

(56) References Cited

U.S. PATENT DOCUMENTS

| | | | | |
|---|---|---|---|---|
| 5,289,291 A * | 2/1994 | Kishi et al. | ..... | 358/443 |
| 6,064,773 A * | 5/2000 | Yamagata | ..... | 382/237 |
| 7,484,855 B2 * | 2/2009 | Kobayashi et al. | ..... | 353/122 |
| 7,646,517 B2 * | 1/2010 | Maki et al. | ..... | 358/538 |
| 7,839,412 B2 * | 11/2010 | Sanno | ..... | 345/581 |
| 2006/0139492 A1 | 6/2006 | Ahn et al. | | |
| 2007/0263091 A1 * | 11/2007 | Kato et al. | ..... | 348/173 |

FOREIGN PATENT DOCUMENTS
CN    101094354 A    12/2007

* cited by examiner

*Primary Examiner* — Kanjibhai Patel
(74) *Attorney, Agent, or Firm* — Ladas & Parry LLP

(57) ABSTRACT

An image detecting device receives a video signal stream including at least one frame. Each frame includes rows of data, and each row of data has a plurality of pixels. The frame has an image portion and a blank portion. The image detecting device includes a characterizing unit and a searcher. The characterizing unit receives the pixels and determines pixel characterization values thereof. The searcher includes an image comparator and a blank comparator. The image comparator and the blank comparator evaluate the pixel characterization value of a current pixel to determine whether the current pixel belongs to the image portion or the blank portion. The searcher derives a position of the image portion based on determined results of the image comparator and the blank comparator. An image detecting method is also disclosed.

16 Claims, 7 Drawing Sheets

IMAGE DETECTING DEVICE AND METHOD

CROSS-REFERENCE TO RELATED APPLICATION

This application claims priority of Taiwanese application no. 097112648, filed on Apr. 8, 2008.

BACKGROUND OF THE INVENTION

1. Field of the Invention

This invention relates to video signal processing technology, more particularly to an image detecting device and method for detecting image positions.

2. Description of the Related Art

A digital television provides an aspect ratio of 16:9 for effectively expanding a viewing range. Since video signal frames are created in a 4:3 aspect ratio format to comply with conventional analog televisions, appropriate size conversion processing is required to present the video signal frames on a widescreen television. Likewise, high-definition video signal frames created in a 6:9 aspect ratio format are required to undergo appropriate size conversion processing to be displayed on conventional analog televisions.

Referring to FIG. 1, conventional size conversion processing involves scaling an original frame 7. However, since it typically cannot match a desired aspect ratio, black blanks are used for compensation. As a result, the processed video signal frame usually comprises image content (or image portion) 81 and blank content (or blank portion) 82.

Interlaced scanning involves separating a frame into even and odd fields for transmission. When a multimedia chip receives an interlaced video signal, the multimedia chip performs de-interlacing processing of the interlaced video signal before the latter can be shown on a display panel. De-interlacing processing normally involves dynamic compensation and interpolation processing using adjacent fields. If the positions of the image portion 81 and the blank portion 82 are not known in advance, it is possible that the image portion 81 of one field and the blank portion 82 of another field would be subjected to computational processing, thereby resulting in incorrect dynamic compensation and interpolation.

Moreover, when the multimedia chip performs other image processing that requires feedback computations, current and previous fields/frames are compared. If an image portion 81 of a field/frame is cross-processed with a blank portion 82 of another field/frame, defects arise, such as noise. Therefore, it is desirable to know the positions of the image portion 81 and the blank portion 82 of a frame before de-interlacing processing or other image processing tasks are performed.

SUMMARY OF THE INVENTION

According to one aspect of the present invention, there is provided an image detecting device adapted for receiving a video signal stream including at least one frame. Each frame includes a plurality of rows of data, and each of the rows of data has a plurality of pixels. The frame has an image portion and a blank portion. The image detecting device comprises a characterizing unit and a searcher. The characterizing unit receives the pixels in sequence and determines a pixel characterization value for each of the pixels. The searcher includes an image comparator and a blank comparator. The image comparator evaluates the pixel characterization value of a current pixel so as to determine whether the current pixel belongs to the image portion. The blank comparator evaluates the pixel characterization value of the current pixel so as to determine whether the current pixel belongs to the blank portion. The searcher derives a position of the image portion based on the determined results of the image comparator and the blank comparator.

According to another aspect of the present invention, there is provided an image detecting method for a video signal stream including at least one frame. Each frame includes a plurality of rows of data, and each of the rows of data has a plurality of pixels. The frame has an image portion and a blank portion. The image detecting method comprises:

a) determining a pixel characterization value for each of the pixels;

b) evaluating the pixel characterization value of a current pixel so as to determine whether the current pixel belongs to the image portion or the blank portion, and c) deriving a position of the image portion based on a result of the determination made in step b).

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
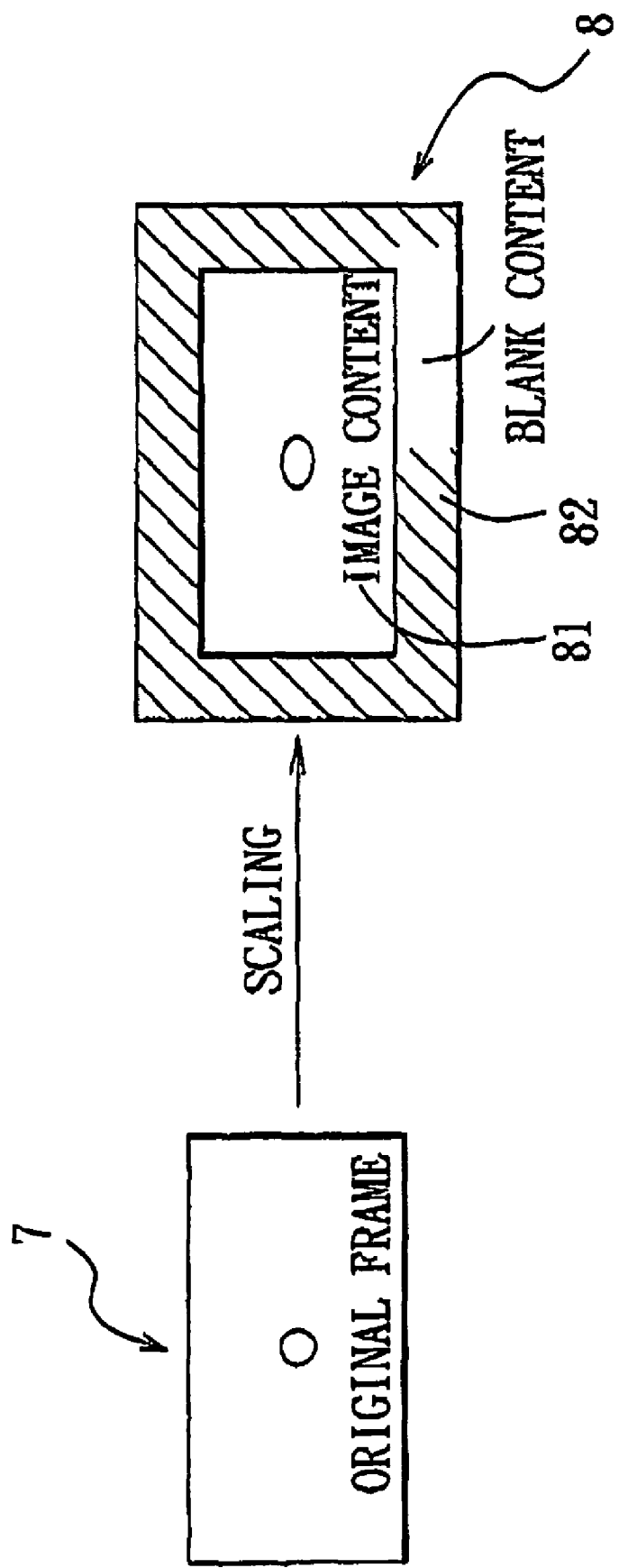
FIG. 1 is a schematic diagram to illustrate creation of a video signal frame in the prior art by appropriately scaling an original frame.
Figure 2:
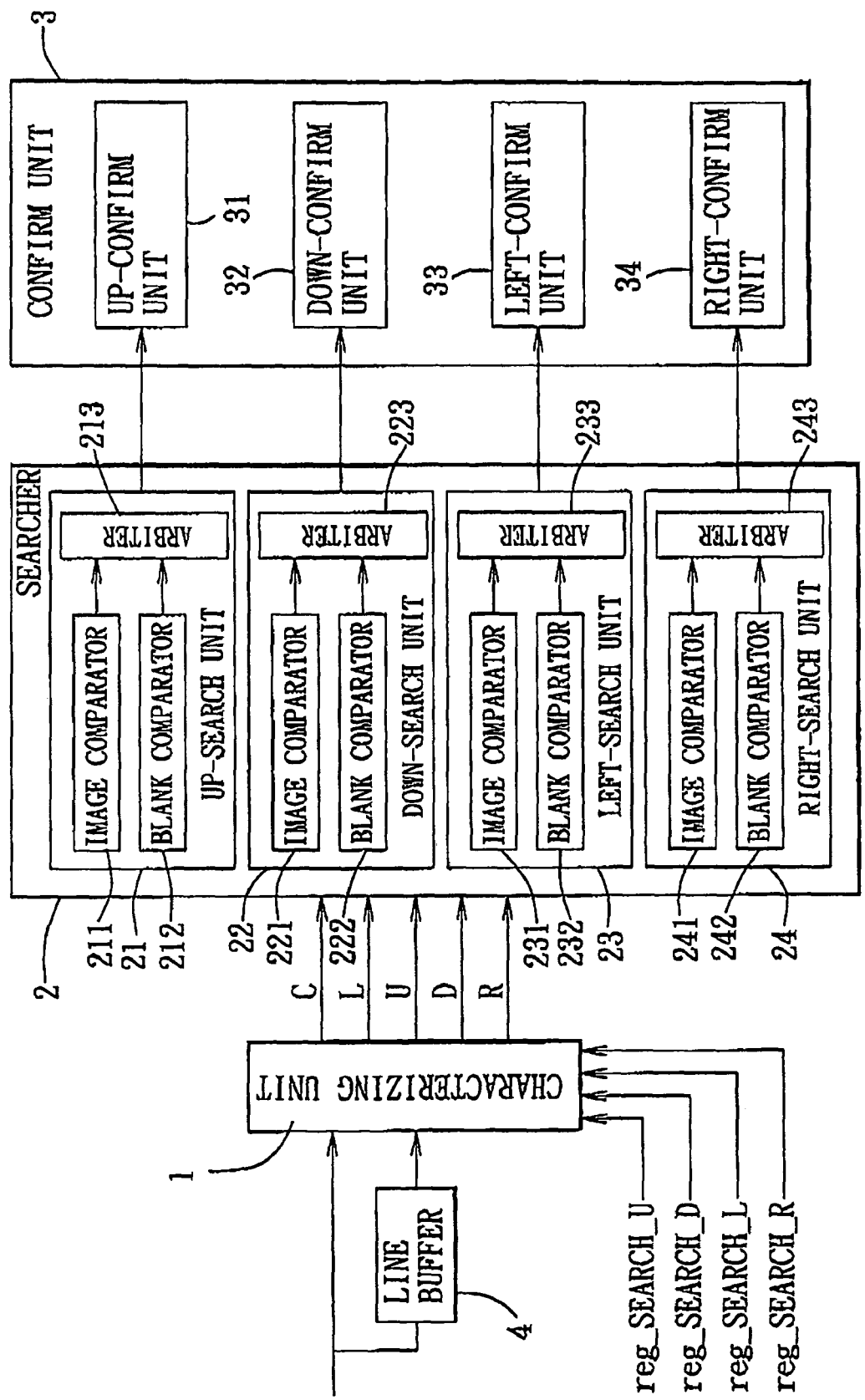
FIG. 2 is a system block diagram of an embodiment of an image detecting device according to the present invention.

Referring to FIG. 2, the embodiment of an image detecting device according to the present invention is shown to be adapted for receiving a video signal stream including a plurality of frames. Each frame has a resolution of M×N, and includes N rows of data (e.g., a first row, a second row, ..., a $N^{th}$ row). Each row of data has M pixels, (e.g., a first pixel, a second pixel, ..., a $M^{th}$ pixel). The image detecting device of this embodiment comprises a characterizing unit 1, a searcher 2, and a confirm unit 3. The searcher 2 includes an up-search unit 21, a down-search unit 22, a left-search unit 23, and a right-search unit 24. Each of the search units 21, 22, 23, 24 includes an image comparator 211, 221, 231, 241, a blank comparator 212, 222, 232, 242, and an arbiter 213, 223, 233, 243. The confirm unit 3 includes an up-confirm unit 31, a down-confirm unit 33, a left-confirm unit 33, and a right-confirm unit 34.

Figure 3:
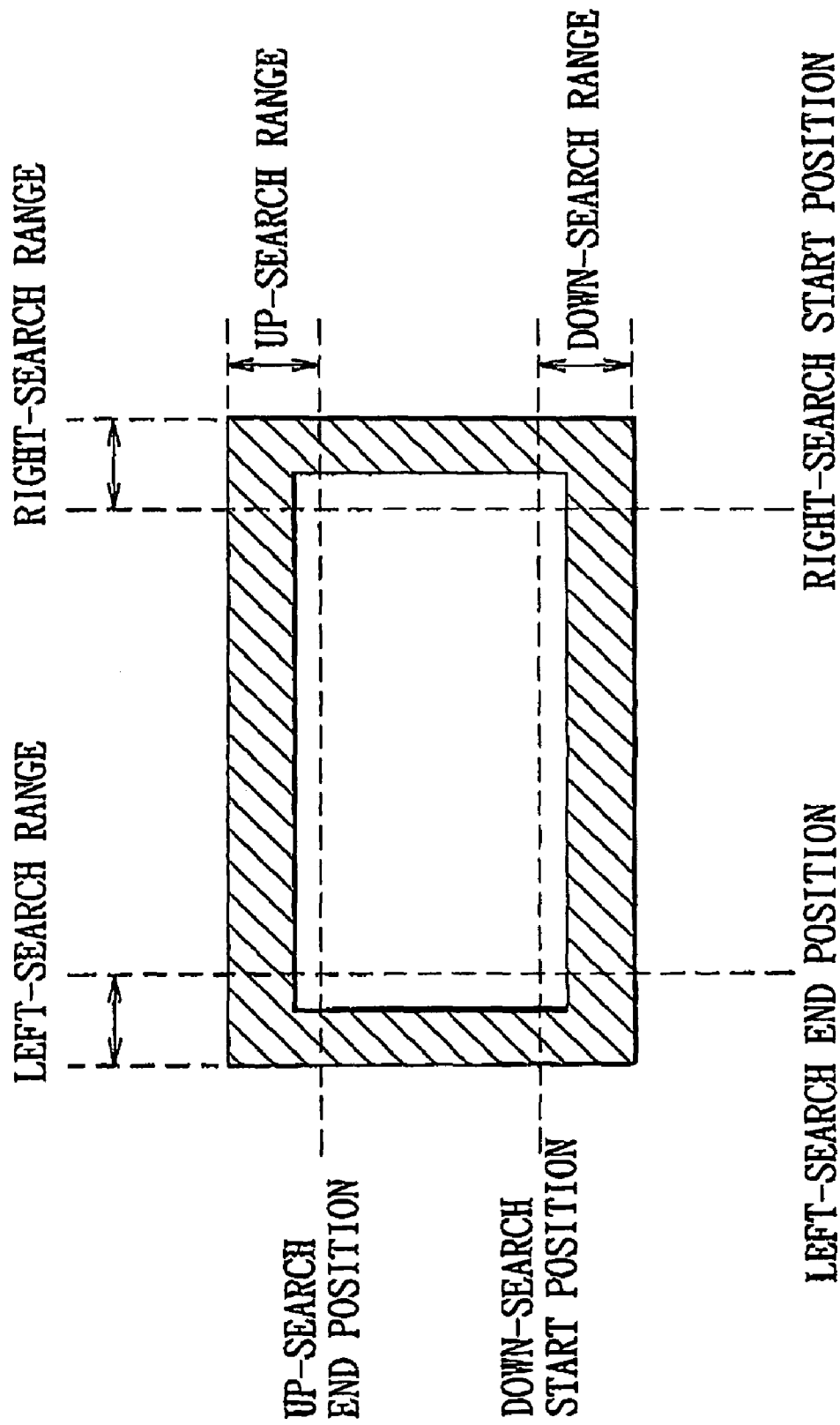
FIG. 3 is a schematic diagram to illustrate search ranges in the embodiment.
Figure 4A:
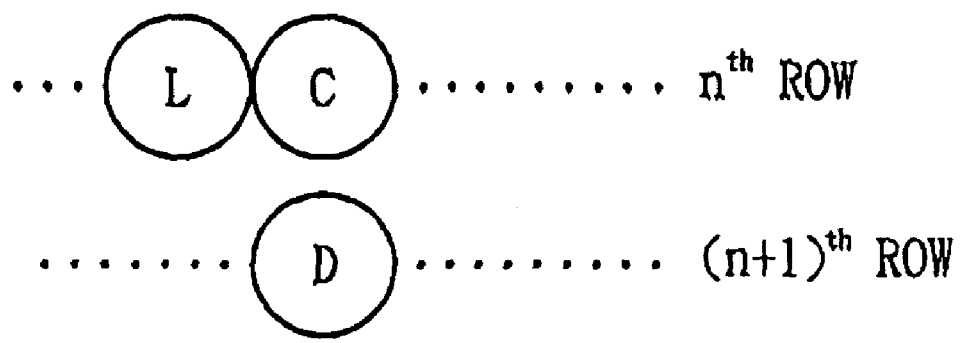
FIGS. 4(a) to 4(d) are schematic diagrams to illustrate relative position relationships between pixel characterization values in different search ranges according to the embodiment.
Figure 4B:
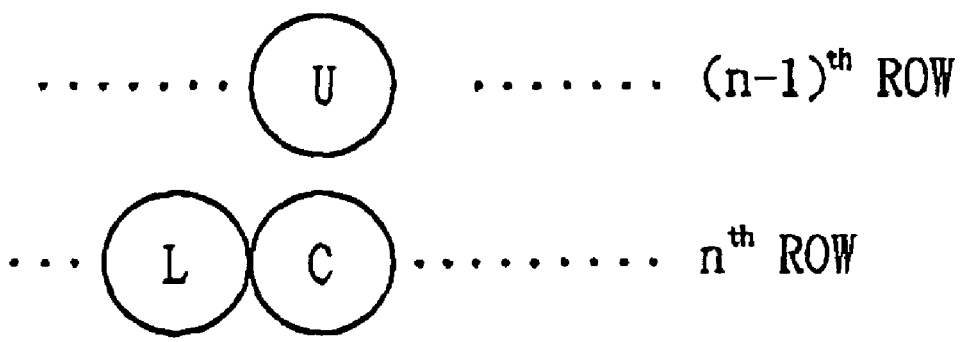
Figure 4C:
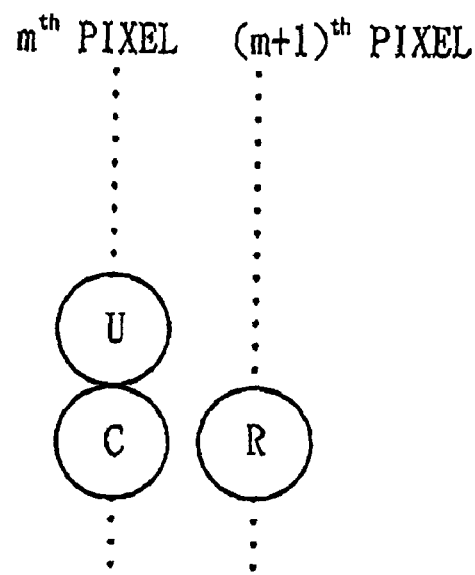
Figure 4D:
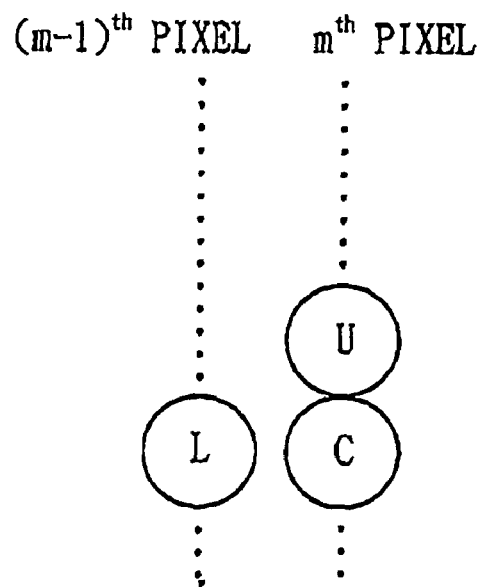

The characterizing unit 1 receives an up-search end position reg_SEARCH_U, a down-search start position reg_SEARCH_D, a left-search end position reg_SEARCH_L, and a right-search start position reg_SEARCH_R, and accordingly defines an up-search range, a down-search range, a left-search range and a right-search range for each frame, as shown in FIG. 3.

The characterizing unit 1 receives pixels in each search range in sequence, as well as pixels delayed by a line buffer 4, calculates a pixel characterization value for each pixel, and outputs an up-pixel characterization value (U), a down-pixel characterization value (D), a current-pixel characterization value (C), a left-pixel characterization value (L), and a right-pixel characterization value (R). The relative position relationships between the pixels corresponding to the up-, down-, left- and right-search ranges are shown in FIGS. 4(*a*) to 4(*d*).

In this embodiment, the characterizing unit 1 characterizes each pixel into a luminance component (y) and a pair of chrominance components (u, v). The pixel characterization value of each pixel is computed as follows; (¼) (2y+|u|+|v|), wherein u and v are signed data types, and |x| stands for the absolute value of x. The luminance component y is given a larger weighting value since it is a main factor in determining characteristics of a pixel.

However, since other base vectors can be chosen to form the base vector of a pixel, the present invention should not be limited in this respect. In addition, since it is possible to use other formulas that can similarly express the characteristics of a pixel, the present invention should not be limited to the formula used in the embodiment.

The image detecting device of the present invention can detect the position of an image portion in each frame from the up-, down-, left-, and right-search ranges. Detection in the up-search range is hereinafter referred to as the up-search method.

Figure 5:
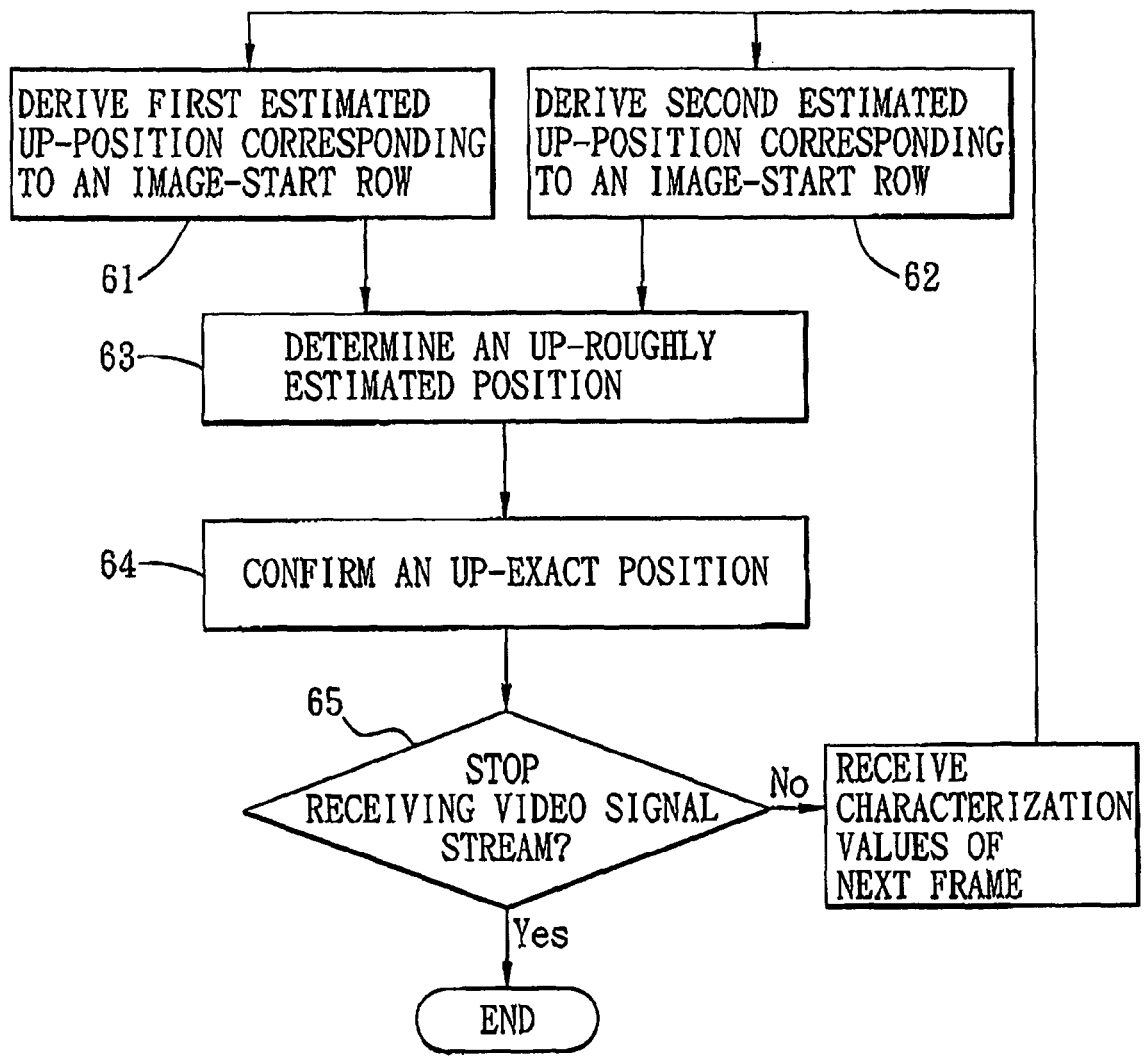
FIG. 5 is a flowchart of an embodiment of an image detecting method according to the present invention.

Referring to FIG. 5, the up-search method executed according to the embodiment of the image detecting method of this invention comprises the following steps:

Step 61: The image comparator 211 evaluates each set of data (in this embodiment, each set means each row) in the up-search range for deriving a first estimated up-position corresponding to an image-start row.

Step 61 includes the following sub-steps:

The image comparator 211 calculates a number of the pixels in a current row of data which are evaluated to belong to the image portion. In particular, when the current-pixel characterization value (C) of a current pixel does not fall within a range defined by a maximum blank value (reg_BLANK$_{max}$) and a minimum blank value (reg_BLANK$_{min}$), the image comparator 211 determines the current pixel to belong to the image portion, and increments an up-image count value (IMAGE_U_cnt) by 1 according to the following Formula (1):

$$\text{IF}((C > \text{reg\_BLANK}_{max})\|(C < \text{reg\_BLANK}_{min}))$$
$$\text{IMAGE\_U\_cnt}++ \quad (1)$$

This is due to the fact that the luminance of the blank portion is a small and non-zero value, wherein a zero luminance value means the color black.

Thereafter, the image comparator 211 determines whether the up-image count value (IMAGE_U_cnt) exceeds a horizontal image determination value (reg_H_IMAGE) (for instance, defined as ¾ of a total number of the pixels in each row of data) so as to derive the first estimated up-position.

In the affirmative, the current row of data (assumed as the n$^{th}$ row) is derived as the image-start row, the n$^{th}$ row is set as the first estimated up-position (as indicated in Formula (2)), and the flow goes to step 63. In the negative, the first estimated up-position is not outputted, the up-image count value (IMAGE_U_cnt) is reset to zero, and the flow goes back to the pixel number calculation sub-step to repeat the aforementioned procedure until evaluation of the up-search range is completed.

$$\text{IF(IMAGE\_U\_cnt} > \text{reg\_H\_IMAGE) return}(n) \quad (2)$$

Step 62: The blank comparator 212 evaluates each set of data (in this embodiment, each set means each row) in the up-search range to derive at which row the blank portion ends, and outputs a second estimated up-position corresponding to the image-start row. Preferably, steps 61 and 62 are performed simultaneously.

Step 62 includes the following sub-steps:

The blank comparator 212 calculates a number of pixels, evaluated to belong to the blank portion, in a current row of data. In particular, with reference to FIG. 4(*a*), according to the following Formula (3), when a difference between the current-pixel characterization value (C) of a current pixel and the pixel characterization value (L) of an adjacent one of the pixels in a same row of the data is less than a likeness threshold value (reg_ALIKE), and a difference between the current-pixel characterization value (C) of the current pixel and the pixel characterization value (D) of a pixel at a same position in an adjacent row of the data exceeds a differentiation threshold value (reg_DIFFER), it means that the characteristic of the current pixel is similar to that on the left side thereof and is different from that on the lower side thereof. Accordingly, the blank comparator 212 derives the current pixel as one belonging to the blank portion, and increments an up-blank count value (BLANK_U_cnt) by 1.

$$\text{IF}((|C-L| \leq \text{reg\_ALIKE}) \&\& (|C-D| \geq \text{reg\_DIFFER}))$$
$$\text{BLANK\_U\_cnt}++ \quad (3)$$

Thereafter, the blank comparator 212 determines whether the up-blank count value (BLANK_U_cnt) exceeds a horizontal blank determination value (reg_H_BLANK) (for instance, defined as ¾ of a total number of the pixels in each row of data) so as to derive the second estimated up-position.

In the affirmative, the current row of data (assumed as the n$^{th}$ row) is derived as the blank-end row, the (n+1)$^{th}$ row is set as the second estimated up-position (as indicated in Formula (4)), and the flow goes to the step 63. In the negative, the second estimated up-position is not outputted, the down-image count value (IMAGE_D_cnt) is reset to zero, and the flow goes back to the pixel number calculation sub-step to repeat the aforementioned procedure until evaluation of the up-search range is completed.

$$\text{IF(BLANK\_U\_cnt} \geq \text{reg\_H\_BLANK) return}(n+1) \quad (4)$$

Step 63: During the processing of the up-search range, the arbiter 213 determines an up-roughly estimated position (ROUGH_U) corresponding to the image-start row by evaluating the results from the image comparator 211 and the blank comparator 212. The following are three possible outcomes.

Outcome 1: When the arbiter 213 receives the first estimated up-position, the first estimated-up position is set as the up-roughly estimated position (ROUGH_U), and the second estimated up-position is ignored. Accordingly, when the arbiter 213 receives the first and second estimated up-positions at the same time, the first estimated up-position is set as the up-roughly estimated position (ROUGH_U).

Outcome 2: When the arbiter 213 does not receive the first estimated up-position but receives the second estimated up-position, the second estimated up-position is set as the up-roughly estimated position (ROUGH_U).

Outcome 3: When the arbiter 213 does not receive the first and second estimated up-positions, the up-roughly estimated position (ROUGH_U) is not updated, and the flow proceeds to the step 65.

It is noted that there are two reasons for execution of Outcome 1. First, when processing the current row (n$^{th}$ row), if the first and second estimated up-positions are received at the same time (i.e., Formulae (2) and (4) are both satisfied), the values corresponding to the first and second estimated up-positions are (n) and (n+1), respectively. For the up-search range, it is desirable that the image-start row appears as early as possible. Therefore, the first estimated up-position is set as the up-roughly estimated position (ROUGH_U).

Second, if the $n^{th}$ row is a purely red image, and the pixel characterization values of the $n^{th}$ row have large differences from the pixel characterization values of the $(n+1)^{th}$ row, the blank comparator 212 may erroneously judge the $n^{th}$ row to be the blank-end row. However, since an image portion generally satisfies both Formulae (1) and (2), the reliability of the image comparator 211 is higher. Therefore, this embodiment uses the first estimated up-position for updating the up-roughly estimated position (ROUGH_U).

Step 64: The up-confirm unit 31 confirms whether the up-roughly estimated position (ROUGH_U) is an up-exact position (EXACT_U) corresponding to the image-start row.

Figure 6:
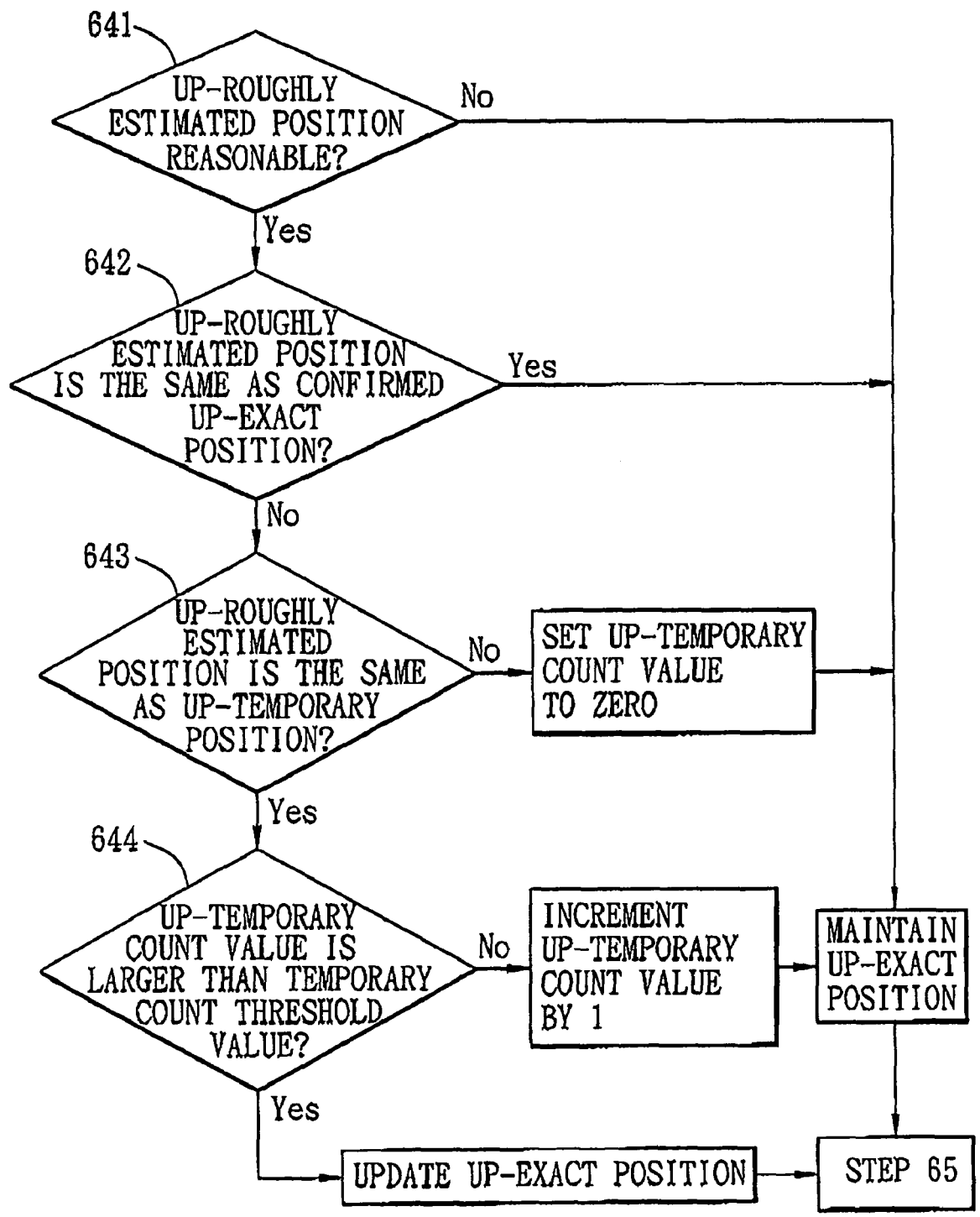
FIG. 6 is a flowchart to illustrate a confirmation procedure of an up-confirm unit of the embodiment.

Referring to FIG. 6, step 64 includes the following sub-steps:

Step 641: The up-confirm unit 31 evaluates whether the up-roughly estimated position (ROUGH_U) is reasonable. In the negative, the up-exact position (EXACT_U) is maintained, and the flow goes to the Step 65. Otherwise, the flow goes to the sub-step 642.

One possible configuration of the up-confirm unit 31 may be exemplified as follows: In a specific application, the image position is known in advance to start at about the $26^{th}$ row of a frame. The up-confirm unit 31 receives an up-position reasonable value (reg_REASON_U) of 20, which indicates a reasonable detected image position should appear after the $20^{th}$ row. If the received up-roughly estimated position (ROUGH_U) has a value of 9, the received up-roughly estimated position (ROUGH_U) is deemed to be unreasonable.

In another possible configuration of the up-confirm unit 31, the up-confirm unit 31 incorporates a pixel-averaging unit for averaging the current-pixel characterization values (C) of a row of data. If the average value of the current-pixel characterization values (C) of the row of data that corresponds to the up-roughly estimated position (ROUGH_U) does not belong to image content (i.e., the average value falls within the range defined by the maximum blank value (reg_BLANK$_{max}$) and the minimum blank value (reg_BLANK$_{min}$)), the up-roughly estimated position (ROUGH_U) received by the up-confirm unit 31 is deemed to be unreasonable.

Sub-step 642: The up-confirm unit 31 determines whether the up-roughly estimated position (ROUGH_U) is the same as a confirmed up-exact position (EXACT_U). In the affirmative, the up-exact position (EXACT_U) is maintained, and the flow goes to the Step 65. Otherwise, the flow goes to the sub-step 643.

Sub-step 643: The up-confirm unit 31 determines whether the up-roughly estimated position (ROUGH_U) is the same as an up-temporary position (TEMP_U). In the negative, the up-exact position (EXACT_U) is maintained, the up-roughly estimated position (ROUGH_U) is used to update the up-temporary position (TEMP_U), an up-temporary count value (reg_TEMP_U) is set to zero, and the flow goes to the Step 65. Otherwise, the flow goes to the sub-step 644.

Sub-step 644: The up-confirm unit 31 determines whether the up-temporary count value (reg_TEMP_U) is larger than a temporary count threshold value. In the negative, the up-exact position (EXACT_U) is maintained and the up-temporary count value (reg_TEMP_U) is incremented by 1. Otherwise, the up-temporary position (TEMP_U) is used to update the up-exact position (EXACT_U).

Step 65: The steps 61 to 64 are repeated to perform the up-search procedure of a next frame, until the image detecting device ceases to receive the video signal stream.

The step 64 is executed because the value of the up-roughly estimated position (ROUGH_U) received from the arbiter 213 may be unstable. Therefore, when the value of the up-roughly estimated position (ROUGH_U) changes, counting of the changed value is re-started. When the same value has appeared continuously and repeatedly for a number of times exceeding the temporary count threshold value, the up-exact position (EXACT_U) will be updated using the up-roughly estimated position (ROUGH_U).

The down-search method executed according to the embodiment of the image detecting method of the invention is used to detect an image-end row in the down-search range, and comprises the following steps:

Step 61': The image comparator 221 evaluates each set of data (in this embodiment, each set means each row) in the down-search range for deriving a first estimated down-position corresponding to the image-end row. In particular, in accordance with the following Formula (5), the image comparator 221 determines whether a current pixel belongs to the image portion, and increments a down-image count value (IMAGE_D_cnt) by 1 whenever a current pixel in the set of data being evaluated is determined to belong to the image portion. The image comparator 221 then determines if the down-image count value (IMAGE_D_cnt) exceeds the horizontal image determination value (reg_H_IMAGE). In the affirmative, the current row of data (assumed as the $n^{th}$ row) is set as the first estimated down-position (as indicated in Formula (6)), and the aforementioned procedure is repeated until evaluation of the down-search range is completed, thereby obtaining the image-end row.

$$IF((C>\text{reg\_BLANK}_{max})\|(C<\text{reg\_BLANK}_{min})) \\ \text{IMAGE\_D\_cnt++} \quad (5)$$

$$IF(\text{IMAGE\_D\_cnt}>\text{reg\_H\_IMAGE}) \text{ save}(n) \quad (6)$$

Step 62': The blank comparator 222 evaluates each set of data (in this embodiment, each set means each row) in the down-search range for deriving a second estimated down-position corresponding to a blank-start row. In particular, in accordance with the following Formula (7), the blank comparator 222 determines whether a current pixel belongs to the blank portion, and increments a down-blank count value (BLANK_D_cnt) by 1 whenever a current pixel in the set of data being evaluated is determined to belong to the blank portion. The blank comparator 222 then determines if the down-blank count value (BLANK_D_cnt) exceeds the horizontal blank determination value (reg_H_BLANK). In the affirmative, the current row of data (assumed as the $n^{th}$ row) is derived as the blank-start row, the $(n-1)^{th}$ row is set as the second estimated down-position (as indicated in Formula (8)), and the aforementioned procedure is repeated until evaluation of the down-search range is completed.

$$IF((|C-L|\leq\text{reg\_ALIKE}) \text{ \&\& } (|C-U|\geq\text{reg\_DIFFER})) \\ \text{BLANK\_D\_cnt++} \quad (7)$$

$$IF(\text{BLANK\_D\_cnt}\geq\text{reg\_H\_BLANK}) \text{ save}(n-1) \quad (8)$$

Step 63': The operation of the arbiter 223 is similar to that of the arbiter 213 in the Step 63. For the down-search range, since it is desirable that the image-end row appears as late as possible, and since the reliability of the image comparator 221 is considered to be higher, the first estimated down-position is given higher priority. Moreover, since the confirmation operation of the down-confirm unit 32 is similar to that of the up-confirm unit 31, further details of the same are omitted herein for the sake of brevity.

For the left-search range, the pixel characterization values (C), (R) and (U), instead of the pixel characterization values (C), (D) and (L) used in the up-search range, are used. For the right-search range, the pixel characterization values (C), (L) and (U), instead of the pixel characterization values (C), (U) and (L) used in the down-search range, are used. Since left-search and right-search methods executed according to the embodiment of the image detecting method of the invention are analogous to and can be derived from the up-search and down-search methods described hereinabove, further details of the same are omitted herein for the sake of brevity.

A modified embodiment of the image detecting method of the invention differs from the previous embodiment in the left-search and right-search methods utilized thereby. The following is a description of the left-search method in the modified embodiment.

Since the operation (the Step 64") of the left-confirm unit 33 is similar to the confirmation operation in the previous embodiment, only the operation of the left-search unit 23 (the Steps 61" to 63") will be described hereinafter.

In the Step 61", the image comparator 231 is used to derive an image-start column. In the Step 62", the blank comparator 232 is used to derive a blank-end column. In the Step 63", the arbiter 233 derives a left-roughly estimated position corresponding to an image-start column by evaluating the results from the image comparator 231 and the blank comparator 232.

The image comparator 231 evaluates each set of data (in this embodiment, each set means each column) in the left-search range for deriving at which column the image portion begins. In particular, the image comparator 231 determines whether a current pixel belongs to the image portion based on the relationships between the current-pixel characterization value (c) and the maximum blank value ($reg\_BLANK_{max}$) as well as the minimum blank value ($reg\_BLANK_{min}$). A current row of data is detected pixel-by-pixel until the relation (C>$reg\_BLANK_{max}$)||(C<$reg\_BLANK_{min}$) is confirmed or evaluation of the entire left-search range is completed. There are three possible outcomes when a confirmed position is compared with a left derived image position:

Outcome 1: When the confirmed position is smaller than the left derived image position, a left image count value (IMAGE_L_cnt) is set to 1, and the confirmed position is used to update the left derived image position recorded for the current frame.

Outcome 2: When the confirmed position is equal to the left derived image position, the left image count value (IMAGE_L_cnt) is incremented by 1, and the left derived image position recorded for the current frame is maintained.

Outcome 3: When the confirmed position exceeds the left derived image position, the left image count value (IMAGE_L_cnt) is decremented by 1, and the left derived image position recorded for the current frame is maintained. However, if the value of the left image count value (IMAGE_L_cnt) is reduced to zero, the image comparator 231 resets the left image count value (IMAGE_L_cnt) to 1, and the confirmed position is used to update the left derived image position recorded for the current frame.

Subsequently, it is determined whether the left image count value (IMAGE_L_cnt) exceeds a vertical image determination value (reg_V_IMAGE). In the affirmative, the image comparator 231 further compares the left derived image positions of the current frame and a previous frame, selects the smaller one as an updating value, sets the updating value as a first estimated left-position, and generates a first left effective signal with a value of 1. In the negative, the left derived image position of the previous frame is maintained, and the first left effective signal is set as 0.

On the other hand, the blank comparator 232 evaluates each set of data (in this embodiment, each set means each column) in the left-search range by taking into account the relationships between the pixel characterization values (C), (U) and (R) and the likeness threshold value (reg_ALIKE), the differentiation threshold value (reg_DIFFER) as well as a reference blank value ($reg\_BLANK_{ref}$) for deriving at which column the blank portion ends. While the operation of the blank comparator 232 is similar to that of the image comparator 231, the pixel-by-pixel detection condition is (|C−L|≦reg_ALIKE) && (|C−D|≧reg_DIFFER) && (C<$reg\_BLANK_{ref}$), and the updating value is incremented by 1 before outputting a second estimated left-position and a corresponding second left effective signal.

The arbiter 233 derives the left-roughly estimated position (ROUGH_L) corresponding to an image-start column by evaluating the results from the image comparator 231 and the blank comparator 232. The following are four possible outcomes:

Outcome 1: When both the first and second left effective signals have a value of 1, the smaller one of the first and second estimated left-positions is selected as the left-roughly estimated position (ROUGH_L).

Outcome 2: When the first and second left effective signals have values of 1 and 0, respectively, the first estimated left-position is selected as the left-roughly estimated position (ROUGH_L).

Outcome 3: When the first and second left effective signals have values of 0 and 1, respectively, the second estimated left-position is selected as the left-roughly estimated position (ROUGH_L).

Outcome 4: When both the first and second left effective signals have a value of 0, the initial left-roughly estimated position (ROUGH_L) is maintained.

From the foregoing, it is observed that preference is given to the smaller value associated with the first left effective signal, the second left effective signal and the left-roughly estimated position (ROUGH_L). This is due to the fact that, for the left-range search, it is preferred that the image-start column appears as early as possible, i.e., closest to a left lateral edge of the frame.

As for the right-search unit 24, since the right-search unit 24 processes the pixel characterization values (U), (C) and (L) in a manner analogous to the processing by the left-search unit 24, further details of the right-search unit 24 will be omitted herein for the sake of brevity.

In summary, the image detecting device of the invention requires assistance of a single line buffer 4 for implementation, uses the search units 21, 22, 23, 24 to determine whether a video content belongs to an image portion, and further uses the confirm units 31, 32, 33, 34 for confirmation so that the detecting mechanism provided by the invention is highly accurate.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An image detecting device adapted for receiving a video signal stream including at least one frame, each frame including a plurality of rows of data, each of the rows of data having a plurality of pixels, the frame having an image portion and a blank portion, the image detecting device comprising:

a characterizing unit receiving the pixels in sequence and determining a pixel characterization value for each of the pixels by characterizing each of the pixels with a luminance component and a pair of chrominance components and makes the pixel characterization value of each of the pixels equal to one-fourth of the sum of twice the luminance component and the pair of the chrominance components; and a searcher including an image comparator evaluating the pixel characterization value of a current pixel so as to determine whether the current pixel belongs to the image portion, and a blank comparator evaluating the pixel characterization value of the current pixel so as to determine whether the current pixel belongs to the blank portion;

wherein the searcher derives a position of the image portion based on the determined results of the image comparator and the blank comparator.

2. The image detecting device as claimed in claim 1, wherein the characterizing unit further defines a search range, the image comparator calculates a number of possible image pixels in each set of the data within the search range and outputs a first estimated position value accordingly, and the blank comparator calculates a number of possible blank pixels in each set of the data within the search range and outputs a second estimated position value accordingly.

3. The image detecting device as claimed in claim 1, wherein the characterizing unit further defines a search range, the image comparator detects pixels pixel-by-pixel in a current one of the rows of data within the search range until one of the pixels is determined to belong to the image portion, and outputs a first estimated position value based on a position of the pixel determined to belong to the image portion, and the blank comparator detects the pixels pixel-by-pixel in a current one of the rows of data within the search range until one of the pixels is determined to belong to the blank portion, and outputs a second estimated position value based on a position of the pixel determined to belong to the blank portion.

4. The image detecting device as claimed in claim 1, wherein the image comparator determines the current pixel to belong to the image portion when the pixel characterization value of the current pixel does not fall within a range defined by a maximum blank value and a minimum blank value.

5. The image detecting device as claimed in claim 1, wherein the blank comparator determines the current pixel as one belonging to the blank portion when a difference between the pixel characterization values of the current pixel and an adjacent one of the pixels in a same set of the data is less than a likeness threshold value, and when a difference between the pixel characterization values of the current pixel and a pixel at a same position in an adjacent set of the data exceeds a differentiation threshold value.

6. The image detecting device as claimed in claim 2, wherein the image comparator selectively outputs the first estimated position value, the blank comparator selectively outputs the second estimated position value, and the searcher further includes an arbiter setting the first estimated position value as a roughly estimated position value when the first estimated position value is received from the image comparator and setting the second estimated position value as the roughly estimated position value when the second estimated position value is received from the blank comparator.

7. The image detecting device as claimed in claim 3, wherein the image comparator further outputs a first effective signal, and the blank comparator further outputs a second effective signal, the searcher further including an arbiter, wherein, when the first and second effective signals indicate both the first and second estimated position values are effective, the arbiter selects one of the first and second estimated position values closest to a lateral edge of the frame as a roughly estimated position value, and wherein, when only one of the first and second effective signals indicates a corresponding one of the first and second estimated position values is effective, the arbiter selects the corresponding one of the first and second estimated position values as the roughly estimated position value.

8. The image detecting device as claimed in claim 1, further comprising a confirm unit resetting a count value associated with the position of the image portion derived by the searcher when the same differs from an exact position, resetting being performed until a number of times the derived position repeats exceeds a threshold value, the derived position being then used to update the exact position.

9. An image detecting method for a video signal stream including at least one frame, each frame including a plurality of rows of data, each of the rows of data having a plurality of pixels, the frame having an image portion and a blank portion, the image detecting method comprising:

a) determining a pixel characterization value for each of the pixels;

b) evaluating the pixel characterization value of a current pixel so as to determine whether the current pixel belongs to the image portion or the blank portion, and determining the current pixel as one belonging to the blank portion when a difference between the pixel characterization values of the current pixel and an adjacent one of the pixels in a same set of the data is less than a likeness threshold value, and when a difference between the pixel characterization values of the current pixel and a pixel at a same position in an adjacent set of the data exceeds a differentiation threshold value; and c) deriving a position of the image portion based on a result of the determination made in the step b).

10. The image detecting method as claimed in claim 9, further comprising the step of defining a search range, the step c) including calculating a number of possible image pixels in each set of the data within the search range and outputting a first estimated position value accordingly, and calculating a number of possible blank pixels in each set of the data within the search range and outputting a second estimated position value accordingly.

11. The image detecting method as claimed in claim 9, further comprising the step of defining a search range, the step c) including detecting the pixels pixel-by-pixel in a current one of the rows of data within the search range until one of the pixels is determined to belong to the image portion, and outputting a first estimated position value based on a position of the pixel determined to belong to the image portion, and detecting the pixels pixel-by-pixel in a current one of the rows of data within the search range until one of the pixels is determined to belong to the blank portion, and outputting a second estimated position value based on a position of the pixel determined to belong to the blank portion.

12. The image detecting method as claimed in claim 9, wherein, in step b), the current pixel is determined to belong to the image portion when the pixel characterization value of the current pixel does not fall within a range defined by a maximum blank value and a minimum blank value.

13. The image detecting method as claimed in claim 10, wherein the first and second estimated position values are outputted selectively, the step c) further including
setting the first estimated position value as a roughly estimated position value when the first estimated position value is outputted, and
setting the second estimated position value as the roughly estimated position value when the second estimated position value is outputted.

14. The image detecting method as claimed in claim 11, wherein the step c) further includes
outputting a first effective signal corresponding to the first estimated position value,
outputting a second effective signal corresponding to the second estimated position value,
when the first and second effective signals indicate both the first and second estimated position values are effective, selecting one of the first and second estimated position values closest to a lateral edge of the frame as a roughly estimated position value, and
when only one of the first and second effective signals indicates a corresponding one of the first and second estimated position values is effective, selecting the corresponding one of the first and second estimated position values as the roughly estimated position value.

15. The image detecting method as claimed in claim 9, further comprising:
resetting a count value associated with the position of the image portion derived in step c) when the same differs from an exact position, wherein resetting is performed until a number of times the derived position repeats exceeds a threshold value; and
updating the exact position with the derived position.

16. The image detecting method as claimed in claim 9, wherein step a) includes
characterizing each of the pixels with a luminance component and a pair of chrominance components and
setting the pixel characterization value of each of the pixels as one-fourth of the sum of twice the luminance component and the pair of the chrominance components.

* * * * *